US007179033B2

(12) United States Patent
Ghiran (10) Patent No.: US 7,179,033 B2
(45) Date of Patent: Feb. 20, 2007

(54) FASTENER NUT FOR HYDROFORMED PARTS

(75) Inventor: Mircea M. Ghiran, Lake Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/167,996

(22) Filed: Jun. 28, 2005

(65) Prior Publication Data

US 2006/0291975 A1    Dec. 28, 2006

(51) Int. Cl.
*F16B 13/06* (2006.01)
*F16B 37/04* (2006.01)

(52) U.S. Cl. .................. 411/179; 411/181; 411/349; 411/340; 411/29

(58) Field of Classification Search ........... 411/181, 411/179, 180, 15, 349, 340, 344, 345, 29, 411/49, 52, 71, 74, 187
See application file for complete search history.

(56) References Cited

U.S. PATENT DOCUMENTS

| 2,415,695 | A | * | 2/1947 | Cann | 411/180 |
| 2,796,907 | A | * | 6/1957 | Dumas | 411/55 |
| 3,276,499 | A | * | 10/1966 | Reusser | 411/179 |
| 3,279,303 | A | * | 10/1966 | Shackelford et al. | 411/49 |
| 3,465,637 | A | * | 9/1969 | Cushman et al. | 411/40 |
| 3,683,740 | A | * | 8/1972 | Martin | 411/40 |
| 5,149,235 | A | * | 9/1992 | Ollis | 411/41 |
| 5,183,357 | A | * | 2/1993 | Palm | 411/29 |
| 6,146,076 | A | * | 11/2000 | Bodin | 411/433 |
| 6,325,580 | B1 | * | 12/2001 | Diamond | 411/40 |
| 6,357,718 | B1 | * | 3/2002 | Crowell et al. | 248/677 |

* cited by examiner

*Primary Examiner*—Flemming Saether
(74) *Attorney, Agent, or Firm*—Laura C. Hargitt (57) ABSTRACT

A fastener nut for hydroformed parts comprises a nut body for receiving a threaded fastener and a locking ring with depending fingers that is received on the nut body. The nut body is adapted to pierce and then form a collar thereabout in a hydroformed part while the part remains in a die cavity under hydroforming pressure. The nut body and the collar formed thereby have a configuration that prevents turning of the locking ring while permitting turning of the nut body relative to the locking ring on full insertion of the nut in the collar, and a cam surface on the nut body that on partial turning of the nut body then forces the locking ring into locking engagement with the collar to thereby attach the fastener nut to the hydroformed part.

7 Claims, 10 Drawing Sheets

FASTENER NUT FOR HYDROFORMED PARTS

TECHNICAL FIELD

The present invention relates to fastener nuts for hydroformed parts and more particularly to fasteners nuts that are insertable in and attachable to hydroformed parts.

BACKGROUND OF THE INVENTION

With certain hydroformed parts, there is the requirement that one or more other components be firmly fastened to the part for the purpose of forming an assembly therewith. For example, certain hydroformed motor vehicle components such as a motor vehicle frame member where one or more other frame components are required to be fastened in a detachable manner thereto to form a frame assembly. In order to accomplish this, suitable fastening means are normally added to the hydroformed part in a secondary operation to provide for such attachment of these other components.

One well-known manner of accomplishing this is by the attachment of a suitable fastener nut at the required location in a secondary operation following the removal of the hydroformed part from the hydroforming dies. Wherein a hole is formed in the part such as with a drilling, laser or water jet cutting operation at each attaching location and then locating and welding a weld-nut in place or locating and mechanically fastening a rivet-nut in place.

Another way of obtaining a suitable means of attachment is known as "hydrotapping" and is disclosed in U.S. Ser. No. 10/690,100 filed Oct. 21, 2003 and entitled "Hydrotapping Unit" and assigned to the assignee of the present invention. Wherein the hydroformed part is pierced and there is then formed an inwardly projecting collar in the part, and the collar is then tapped to form an internal thread of substantial length. This is accomplished while the hydroformed part remains in the hydroforming dies and still under the hydroforming pressure that then supports the piercing and collar forming operations. As a result, this significantly reduces the time to process the part as compared with requiring a secondary operation following removal of the hydroformed part from the dies.

SUMMARY OF THE INVENTION

The present invention is in a fastener nut that is insertable in and then attachable to a hydroformed part while the part remains in the hydroforming die cavity. The fastener nut comprises two parts; namely, a nut body and a locking ring with multiple fingers that is received by the nut body. Wherein the nut body is adapted to receive a threaded fastener such as a stud or bolt and is also adapted to pierce and form a retention collar in a hydroformed part while the part remains in the die cavity under hydroforming pressure. The nut body and the retention collar formed thereby have a configuration adapted to prevent turning of the locking ring with respect to the retention collar while permitting turning of the nut body relative to the locking ring. Wherein only partial turning of the nut body causes a cam surface on the nut body to force the locking ring into locking engagement with the retention collar to thereby attach the fastener nut to the hydroformed part.

The insertion and attachment of the fastener nut are accomplished in the hydroforming apparatus with a power unit immediately following the hydroforming of a part. Wherein the power unit is mounted on one of the dies that forms the die cavity and has an output shaft that is receivable in a passage in this die that extends to the die cavity surface at a location opposite where the attaching location is required on the hydroformed part. The nut body is adapted to be drivingly engaged by the power unit output shaft and positioned thereby with a punch portion of the nut body against the part at the required attaching location during the hydroforming operation to prevent the part from rupturing outward as this location.

The power unit then forces the punch portion of the nut body to pierce and form the retention collar in the part while the hydroforming pressure remains in the part to assist in these operations. Wherein the punch portion of the nut body is eventually inserted inwardly past the retention collar while the fingers of the locking ring remain trapped by the retention collar act to prevent turning of the locking ring. The power unit then operates to turn the nut body a partial turn whereby a cam surface on the nut body forces the fingers radially outward and into mechanical locking engagement with a terminal annular edge portion of the retention collar to thereby lock both the nut body and the locking ring to the retention collar.

All these operations are accomplished as a continuation of the hydroforming process in the dies which following the insertion and fastening of the nut are then opened to allow removal of the finished hydroformed part with the nut accurately and firmly fastened in place. As a result, a very strong and rigid attaching means for subsequent component attachment to the hydroformed part is quickly and completely accomplished while the hydroformed part remains in the dies and with the versatility that such attaching means can be provided at one or more required attaching locations on the part simultaneously. Moreover, attaching nuts of different sizes can be used at different locations where the fastening requirements are different and are dependent on a particular component to be attached to the hydroformed part to form the required final assembly.

Further aspects of the invention including the areas of applicability of the present invention will become apparent from the detailed description provided hereinafter. Wherein it will be understood the detailed description and accompanying drawings of an exemplary embodiment of the invention are intended for purposes of illustrating and teaching the invention and are not intended to limit the scope of the invention.

DESCRIPTION OF EXEMPLARY EMBODIMENT

Figure 1:
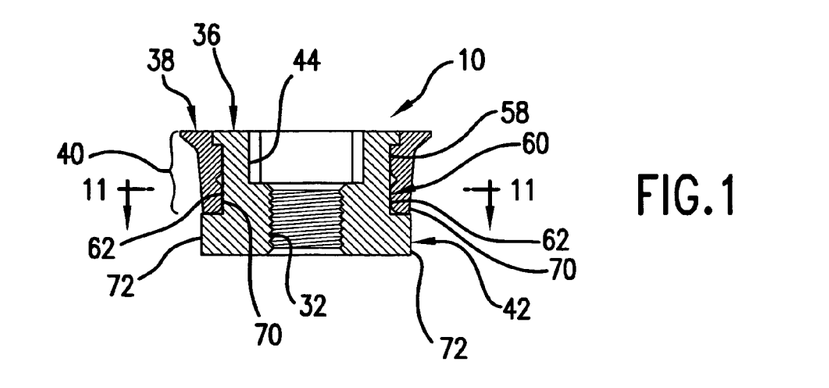
FIG. 1 is a sectional view of a fastener nut according to the present invention.
Figure 2:
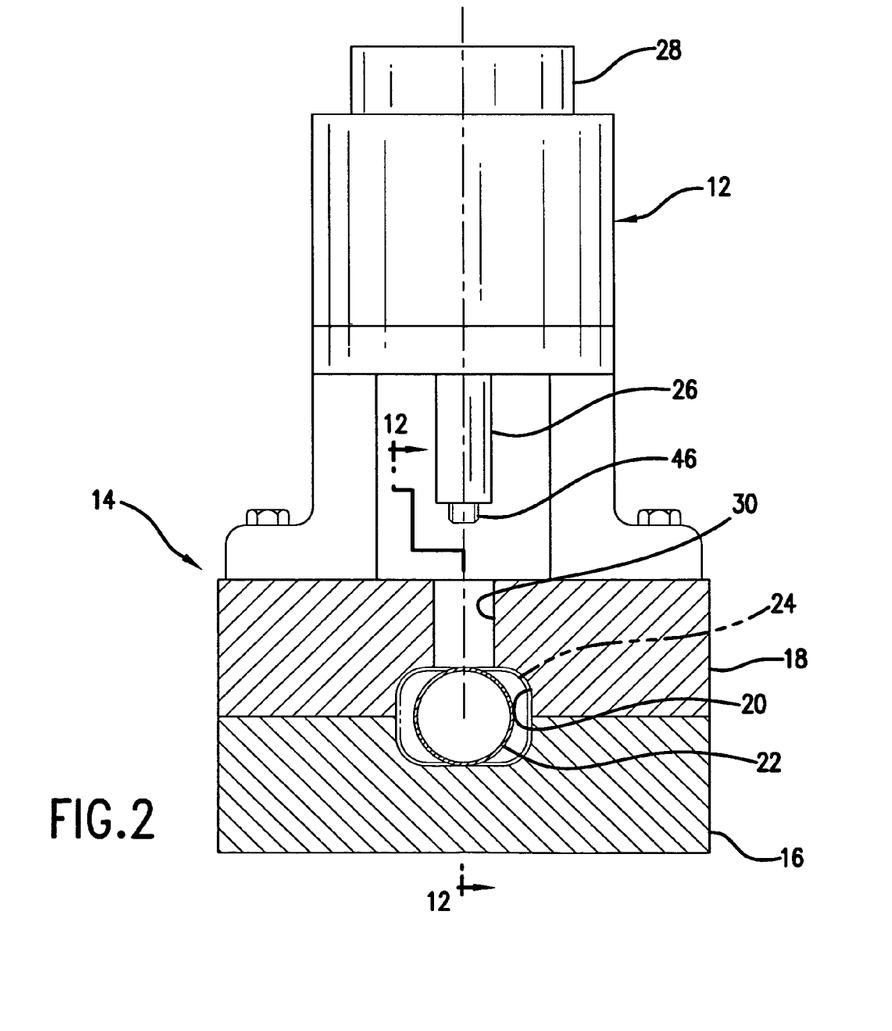
FIG. 2 is a partial cross-sectional view of hydroforming apparatus that includes a power unit for inserting and attaching the fastener nut in FIG. 1 to a hydroformed part.

Referring to the accompanying drawings, there is shown in FIG. 1 a mechanically attachable fastener nut 10 according to the present invention as adapted for insertion in and attachment to a hydroformed part by a power unit 12 following the formation of the part in hydroforming apparatus such as that shown partially in FIG. 2 and generally designated as 14. Wherein the apparatus 14 comprises a lower die 16 and an upper die 18 which when closed as shown co-operatively form a die cavity 20 having a surface conforming to the shape of the part that is required and which in the illustrative example is a motor vehicle frame component. In the hydroforming process and in a conventional manner, a piece 22 of round tubular metal stock is captured between the dies in the die cavity and a hydroforming fluid typically in the form of a water based liquid solution is then delivered through one end of the stock piece to the interior thereof while the other end is blocked. The hydroforming fluid thus delivered is pressurized and is maintained at a pressure sufficient to forcibly expand the wall of the captured piece outward against and conform to the cavity surface to thereby form a hydroformed part 24 as shown in phantom lines in FIG. 2.

It will also be understood that following the insertion and fastening of an assembly fastening means to the hydroformed part as described hereinafter, the hydroforming fluid that remains in the part is then exhausted in a conventional manner by opening the blocked end thereof where after the dies are opened to permit removal of the hydroformed part 24. Further details of the type of hydroforming apparatus for which the present invention is suited are for example disclosed in U.S. Pat. No. 5,321,964 assigned to the assignee of this invention and which is hereby incorporated by reference.

The power unit 12 which is operable to insert and attach the fastener nut 10 has an output shaft 26 and an electronic control module 28 that is programmed to operate the power unit to extend and retract the output shaft and also to turn the output shaft according to a prescribed schedule to effect insertion and fastening of the fastener nut 10 to the hydroformed part 24 as described hereinafter. The power unit 12 and the electronic control module 28 are of any suitable conventional type wherein for the example the power unit may be a hydraulically operated linear/rotary output device, an electro-mechanically operated linear/rotary output device, or a combination thereof and the electronic control module 28 is of a versatile machine dedicated type.

The required location of the fastener nut 10 is in this illustrative example on the upper side of the hydroformed part 24 and for that reason the power unit 12 is rigidly fastened as shown to the upper side of the upper die 18 with its output shaft 26 directed downward and closely receivable in a cylindrical passage 30 in the upper die 18. Wherein the passage 30 extends through the upper die to the die cavity surface therein and is centrally aligned with the required attaching location on the upper side of the hydroformed part 24.

The fastener nut 10 has a centrally located helical thread 32 for receiving a threaded fastener such as a stud or a bolt and is adapted to support the wall of the hydroformed part 24 at the attaching location opposite the passage 30 during the hydroforming of the part and then immediately following the hydroforming operation and by linear forced movement by the power unit 12 pierce and form an inwardly projecting nut retention collar 34 in the part. See FIG. 15. The fastener nut 10 is also adapted to then be mechanically locked to the retention collar 34 with forced turning by the power unit 12 of one of the two pieces that form the nut as described hereinafter.

Referring to FIGS. 1 and 3–11, the mechanically attachable fastener nut 10 is adapted to produce the above operations with the power unit 12 by being formed of two pieces. Namely, (1) a nut body 36 that is adapted to be powered by the power unit output shaft 26 in piercing and forming the retention collar 34 in the hydroformed part, and (2) a locking ring 38 that is received in an annular recessed portion 40 of the nut body. Wherein the locking ring 38 is adapted to provide locking of the nut body 36 and thereby the nut 10 including the locking ring to the hydroformed part 24 on partial turning of the nut body relative to the locking ring as described in more detail hereinafter.

Describing the nut body 36 in further detail and with reference to FIGS. 1 and 3–7 the nut body has an integral punch 42 at one end and a square-shaped drive socket 44 at the other end for receiving a square-shaped drive end 46 of the output shaft 26. Wherein the punch 42 is defined by a hexagonal-shaped portion 48, an end face 50 and a cutting edge 52 that is interrupted by a chamfer 54. Whereby the punch 42 is adapted to pierce and form the retention collar 34 with a hexagonal shape and wherein a hexagonally-shaped slug 56 that results from such piercing is caused by the chamfer 54 to remain integral with the collar while being deflected by the nut 10 out of the way of the nut insertion hole defined by the collar as the nut proceeds into the part. See FIG. 15.

Figure 3:
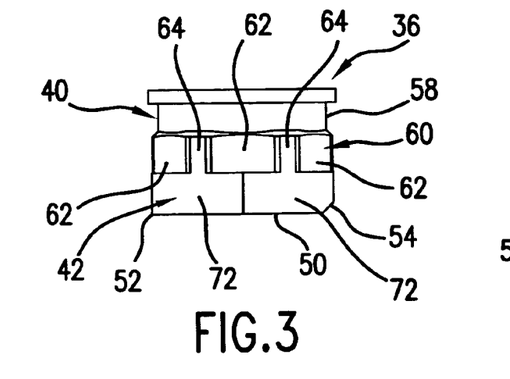
FIG. 3 is a side view of the nut body in FIG. 1.
Figure 4:
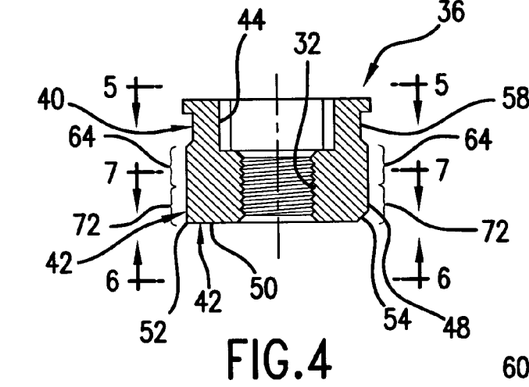
FIG. 4 is a sectional view of the nut body in FIG. 1.
Figure 5:
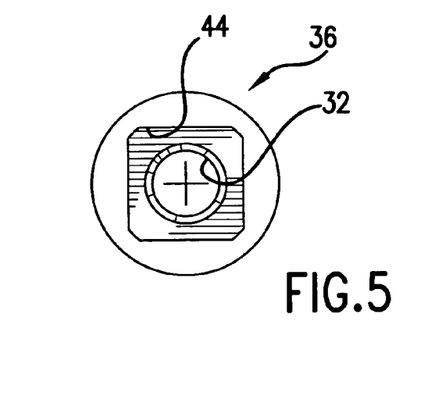
FIG. 5 is a view taken along the line 5—5 in FIG. 4 when looking in the direction of the arrows.
Figure 6:
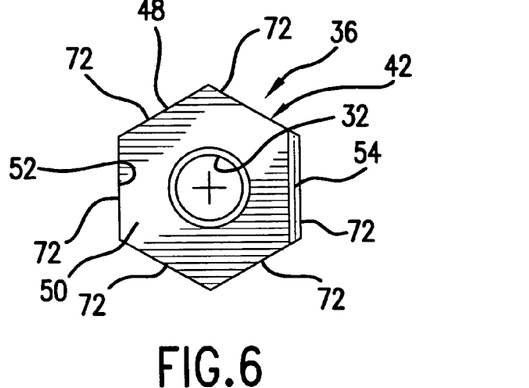
FIG. 6 is view taken along the line 6—6 in FIG. 4 when looking in the direction of the arrows.
Figure 7:
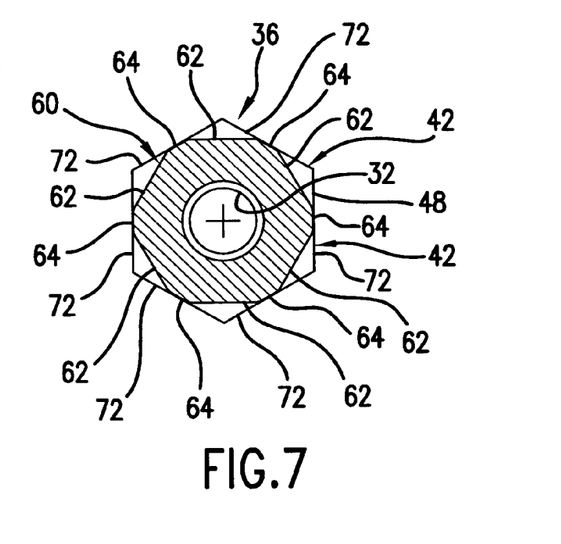
FIG. 7 is a view taken along the line 7—7 in FIG. 4 when looking in the direction of the arrows.
Figure 8:
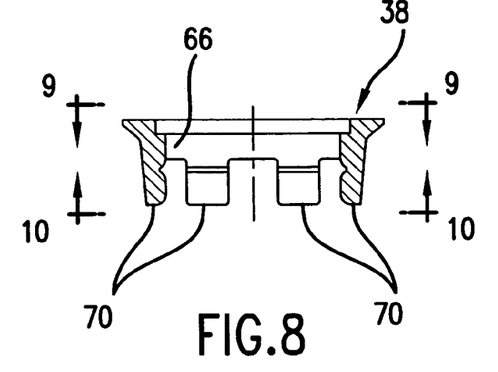
FIG. 8 is a sectional view of the locking ring in FIG. 1.
Figure 9:
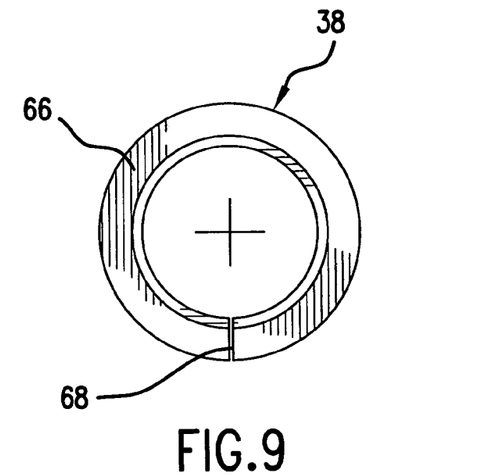
FIG. 9 is a view taken along the line 9—9 in FIG. 8 when looking in the direction of the arrows.
Figure 10:
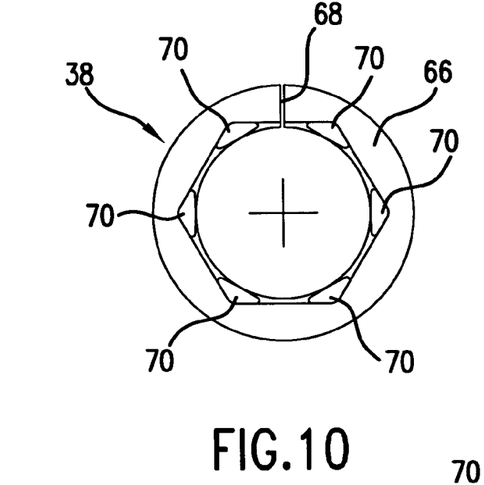
FIG. 10 is a view taken along the line 10—10 in FIG. 8 when looking in the directions of the arrows.

The axial length of the integral punch 42 is determined so that the punch after piercing and forming the hexagonal-shaped retention collar 34 in the hydroformed part and on further entry into the hydroformed part is positioned free of the retention collar to allow the nut body 36 to then be turned to effect locking of the nut 10 in place. Wherein for receiving the locking ring 38 and providing such locking action, the recessed portion 40 of the nut body is defined by an annular groove 58 and an adjoining cam 60. Wherein the cam 60 adjoins at one end with the groove 58 and at the other end thereof with the hexagonal-shaped portion 48 of the punch 42. The cam 60 has a dodecagon-shape (12-sided polygon shape) comprising six flat ramp surfaces 62 of equal size and six flat crests 64 of equal size that are located intermediate of and intersect with the respective ramp surfaces. The crests 64 are flush with the flat sides 72 of the punch 42 and have a peripheral or length dimension substantially less than that of the ramp surfaces 62 as seen in FIG. 7 and a width dimension as measured axially the same as the ramp surfaces as seen in FIG. 3.

Describing the locking ring 38 in further detail and with reference to FIGS. 1 and 8–11, the locking ring has an annular or ring-shaped body 66 with a split 68 that enables the locking ring to be radially expanded for reception on the nut body and then snap in to place in the recessed portion 40 thereof to be then be retained thereby. The ring body 66 has a plurality of integral fingers 70 that depend in an axial direction from the ring body and are equally angularly spaced from and extend parallel to each other. With the number of fingers 70 corresponding to the number of flat sides 72 of the punch 42 and the corresponding equal number of flat ramps 62 of the cam 60 and there thus being a total of six such fingers in this illustrative example.

Figure 11:
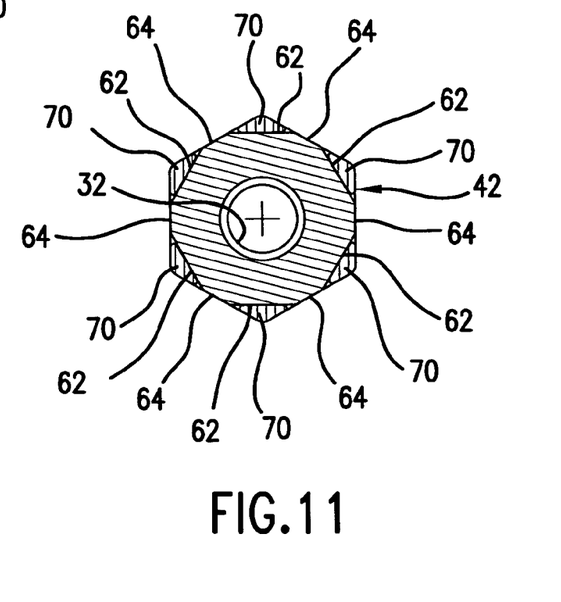
FIG. 11 is a view taken along the line 11—11 in FIG. 1 when looking in the direction of the arrows.

The locking ring 38 is received in the recessed portion 40 of the nut body 36 with the ring body 66 received against the bottom surface of the groove 58 and the fingers 70 initially received against the ramp surfaces 62 of the cam 60. See FIG. 11. The fingers 70 have a generally triangular-shaped cross section as seen in FIG. 11 and the dodecagon-shaped cam 60 at its ramp surfaces 62 is angularly indexed relative to the hexagonal-shaped punch 42 through an angle of 30 degrees (360 degrees divided by twice the number of fingers) and as a result the outer sides of the fingers 70 are initially positioned level with the hexagonal-shaped portion 48 of the punch 42 and form in effect aligned extensions thereof as shown in FIGS. 1 and 11. Whereby the fingers 70 are initially positioned to proceed into the hexagonal-shaped retention collar 34 formed by the punch 42 and then after the punch has been extended further inwardly and past the retention collar, the fingers 70 by their engagement with the retention collar prevent the locking ring 38 from turning. While the nut body 36 is then free to turn and on only partial turning thereof relative to the locking ring 38 effects locking of the nut 10 to the collar 34 as described in more detail hereinafter.

Figure 12:
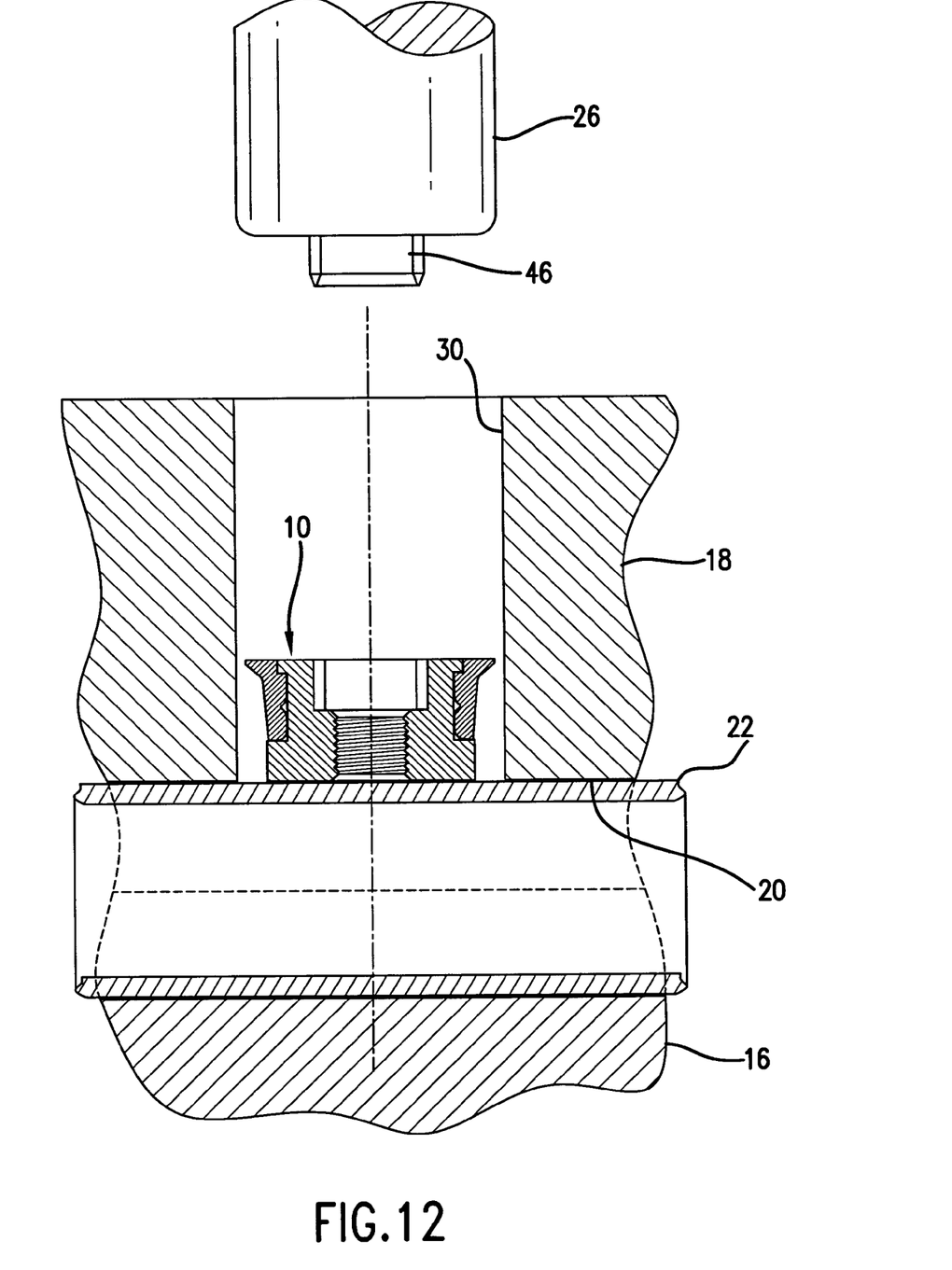
FIGS. 12–18 are enlarged views taken along the line 12—12 in FIG. 2 when looking in the direction and of the arrows and show the processing of the nut in FIG. 1.

Describing now a typical sequence of operations in the insertion and fastening of the nut 10 and with reference to FIGS. 12–19, the power unit 12 is operated to position the output shaft 26 so that it is clear of the upper die passage 30 after the dies 16 and 18 have closed on a stock piece 22 and prior to the admission of the hydroforming fluid. See FIG. 12. The nut 10, that it will be understood has been taken from a stock of such parts, is then inserted into the upper die passage 30 in a centered position against the stock piece 22 as also shown in FIG. 12. It also being understood that this insertion and centering of the assembly nut can be accomplished with any suitable means such as a robot or other suitable nut handling and insertion device.

Figure 13:
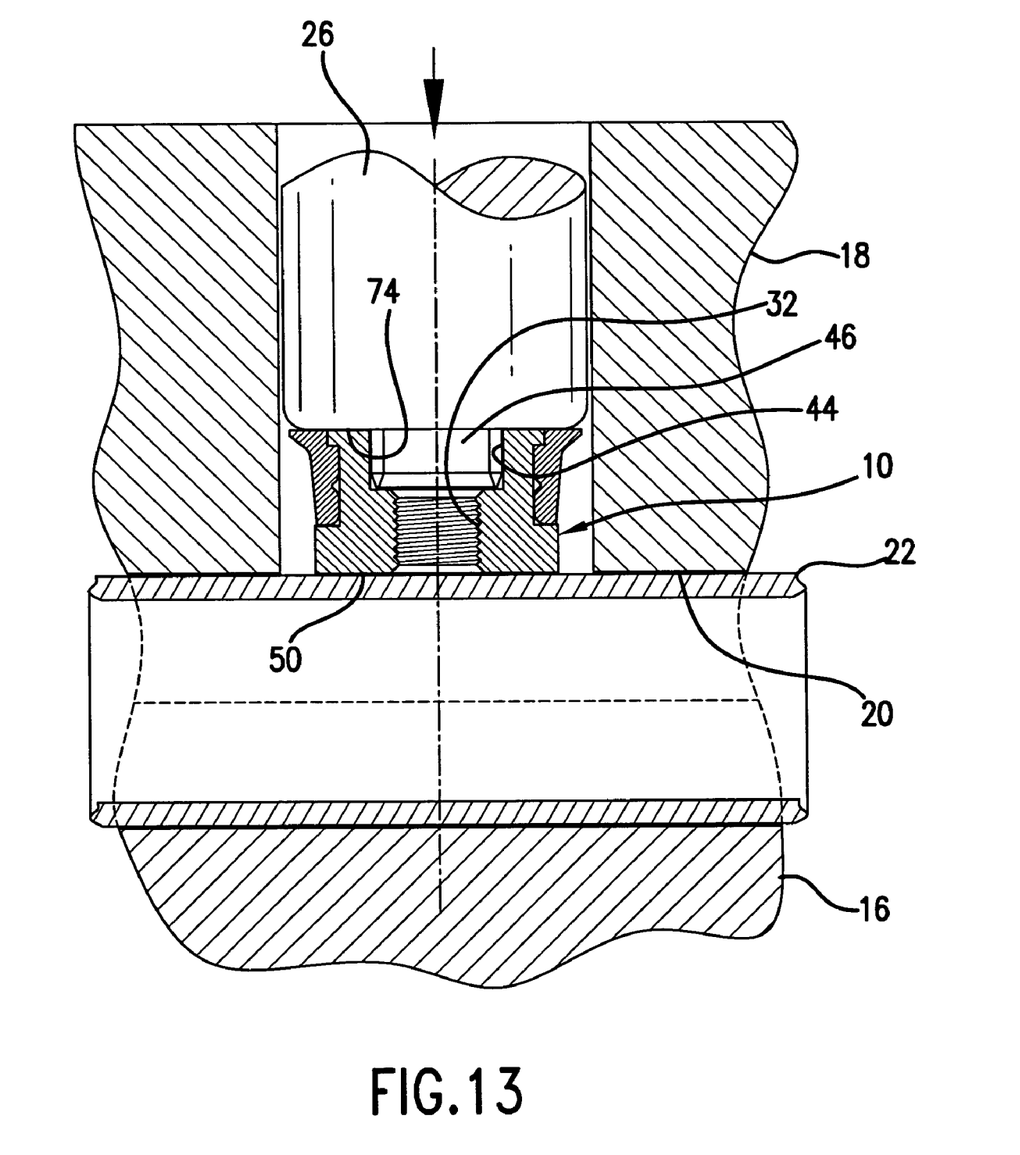

With the nut 10 thus inserted and centered, the power unit 12 then extends its output shaft 26 to engage its drive end 46 in the nut body drive socket 44 and with an annular shoulder 74 on the output shaft hold the nut 10 firmly in place as shown in FIG. 13. It also being understood that as an alternative way to accomplishing such insertion and centering of the nut 10, the nut can be received at its nut body drive socket 44 on the power unit output shaft drive end 46 while the output shaft is fully retracted and temporarily held there with a suitable sticky substance such as grease while the output shaft is extended (lowered) to position the nut against the stock piece.

Figure 14:
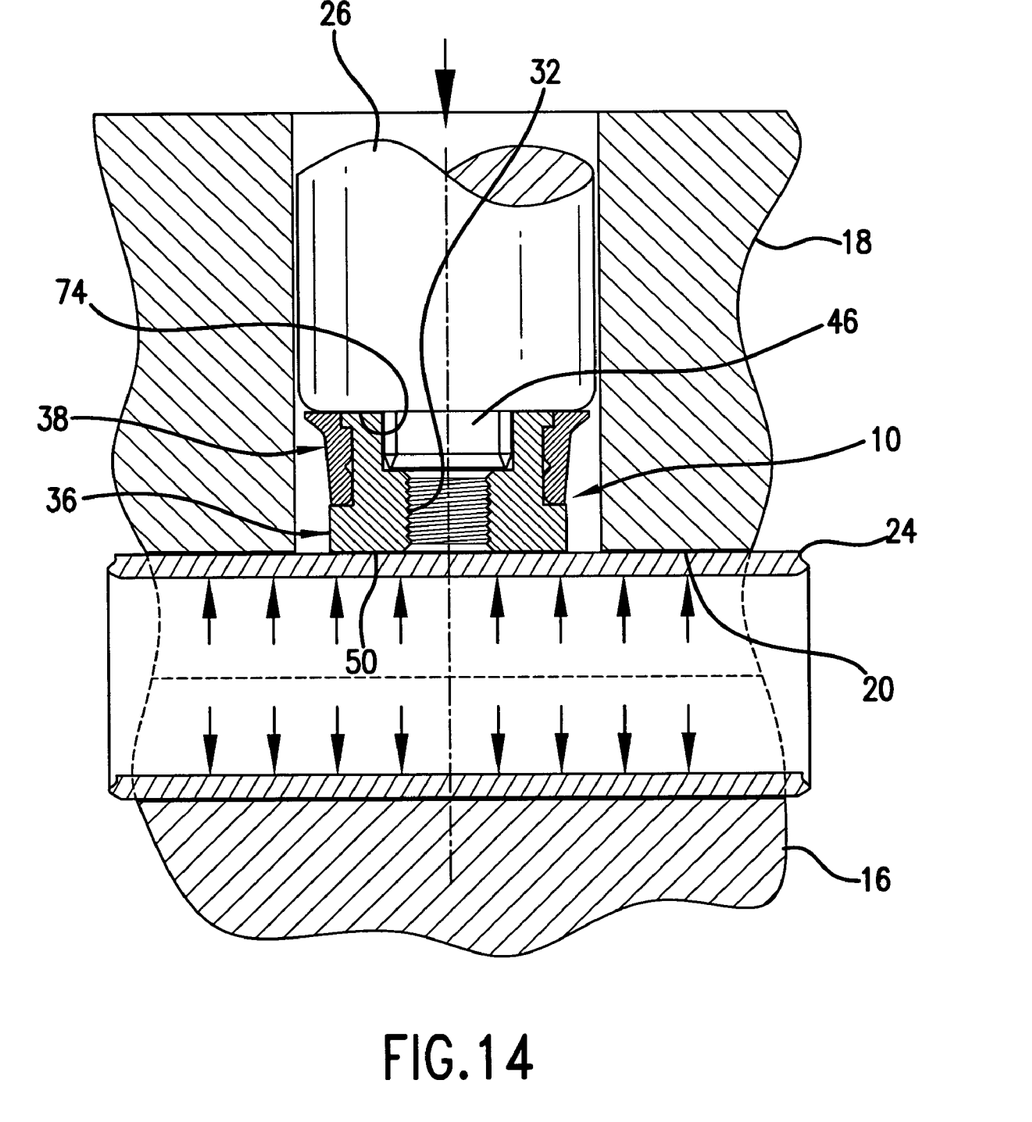

With the nut 10 thus held firmly in place by the output shaft 26, the hydroforming fluid is then delivered under pressure to the interior of the stock piece 22 to form the piece against the die cavity surface 20 to the required shape resulting in the hydroformed part 24 as shown in FIG. 14. The pressure necessary to effect the hydroforming operation is typically in the range of 10,000–20,000 psi for tubular steel motor vehicle frame applications and the flat hexagonal-shaped punch face 50 of the nut body 36 supports the wall of the part inward of the upper die passage 30 against the hydraulic force that is generated to prevent rupturing of the part that could otherwise occur at this interruption in the die cavity surface by the passage 30.

Immediately following the hydroforming of the part 24 to the required shape and while the hydroforming pressure is maintained therein, the power unit 12 further extends its output shaft 26 forcing the punch 42 to pierce a hexagonal-shaped hole in the part with the cutting edge 52 while the hexagonal-shaped slug 56 that results from this piercing operation remains integral with the wall of the part as a result of the chamfer 54 and is deflected inwardly and clear of the pierced hole by the nut as it proceeds into the part. See FIG. 15. Wherein the hydroforming pressure provides internal support of the wall of the part in an annular region immediately outward of the upper die passage 30 to enable such piercing and also the inward wall forming action about the pierced hole in the producing of the retention collar 34 by the hexagonal-shaped punch 42 and the trailing locking ring 38. Wherein there is fully formed the inwardly projecting retention collar 34 shown in FIG. 15 by the cooperative action of the punch 42 and the trailing ring-shaped body 68 of the locking ring 38 as the nut 10 proceeds into the part.

Figure 15:
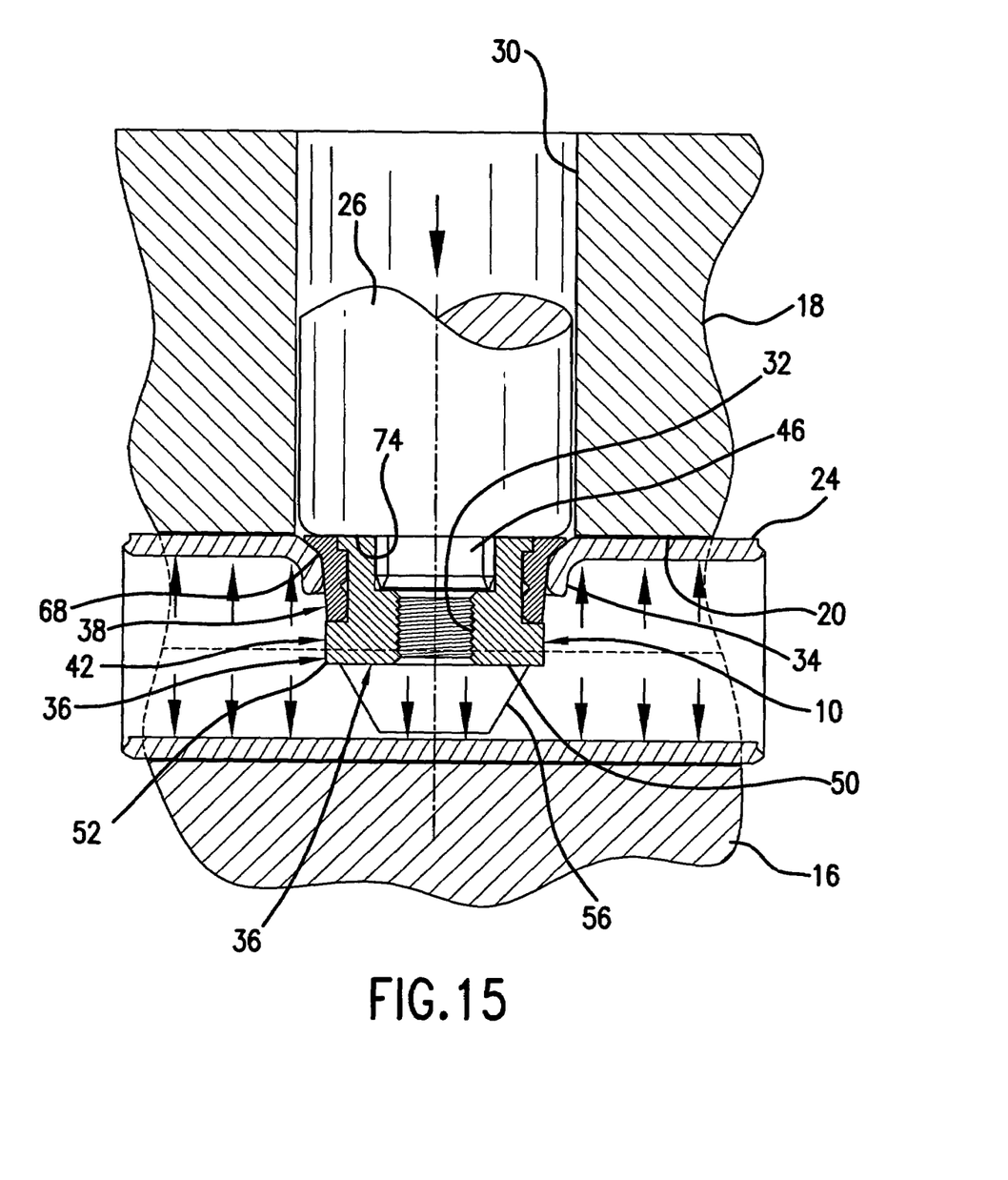

In the above piercing and retention collar forming operation, the shoulder 74 of the shaft 26 by its engagement with the outer end of the nut 10 prevents fluid in the part from escaping out through the threaded hole in the nut during the piercing operation and subsequent collar forming operation. While the nut 10 by the contact of its punch portion 42 and subsequently its locking ring 38 with the part prevents fluid in the part from escaping outward around the nut during the piercing operation and subsequent collar forming operation and wherein the locking ring 38 at the end of the collar forming operation is then forcibly held in surface-to-surface sealing contact with the retention collar 34.

In preparation for the locking operation with the locking ring 38, the nut is inserted a sufficient distance into the hydroformed part by the power unit 12 so that the hexagonal-shaped punch 42 that is a part of the nut body 36 and after having pierced and formed the retention collar 34 is then clear of the retention collar. Whereby the fingers 70 of the locking ring 38 that is carried by the nut body 36 are then closely received by and positioned within the retention collar 34 to thereby prevent turning of the locking ring while the ends of the fingers are then positioned to extend inwardly a substantial distance past the edge of the retention collar as shown in FIG. 15.

Figure 16:
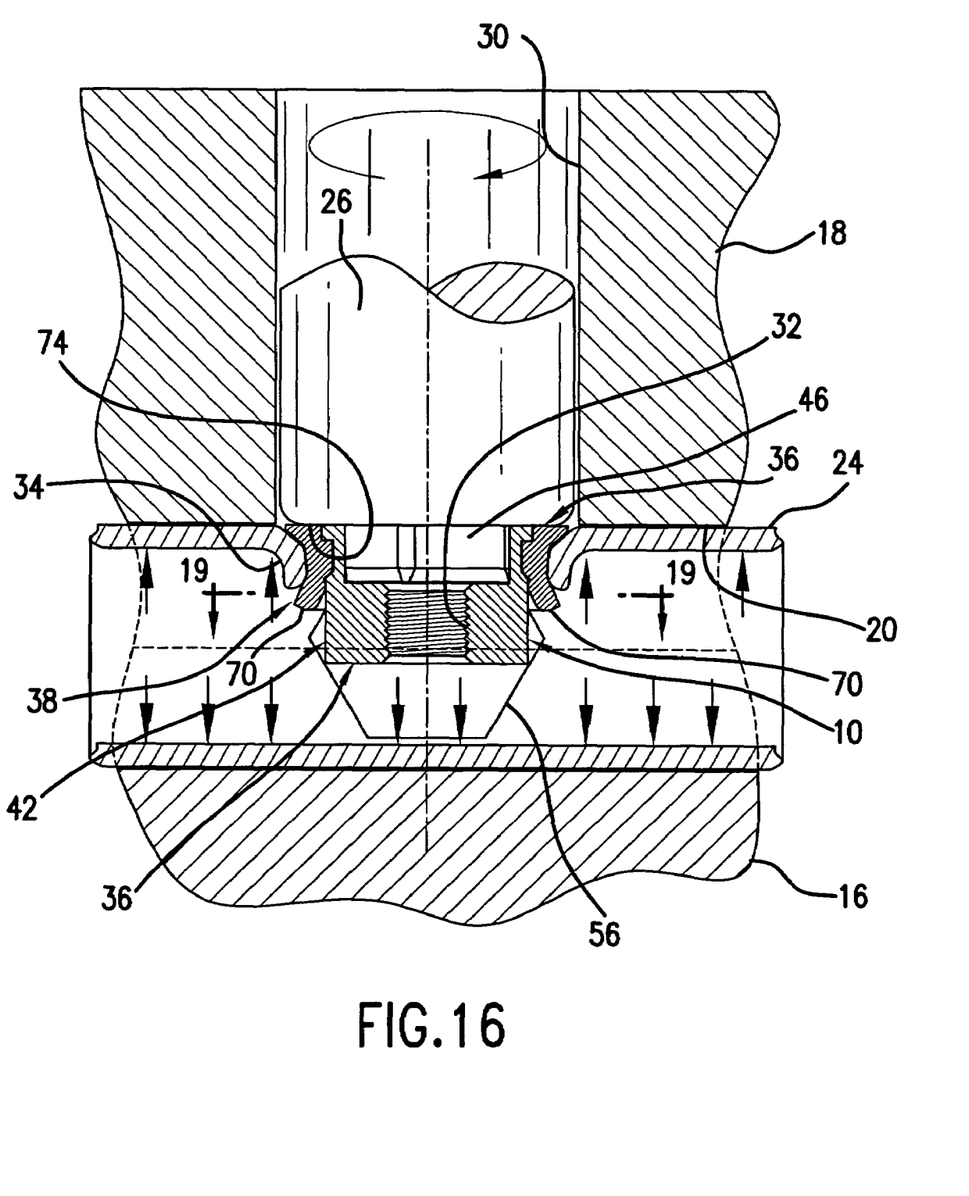
Figures 18, 19:
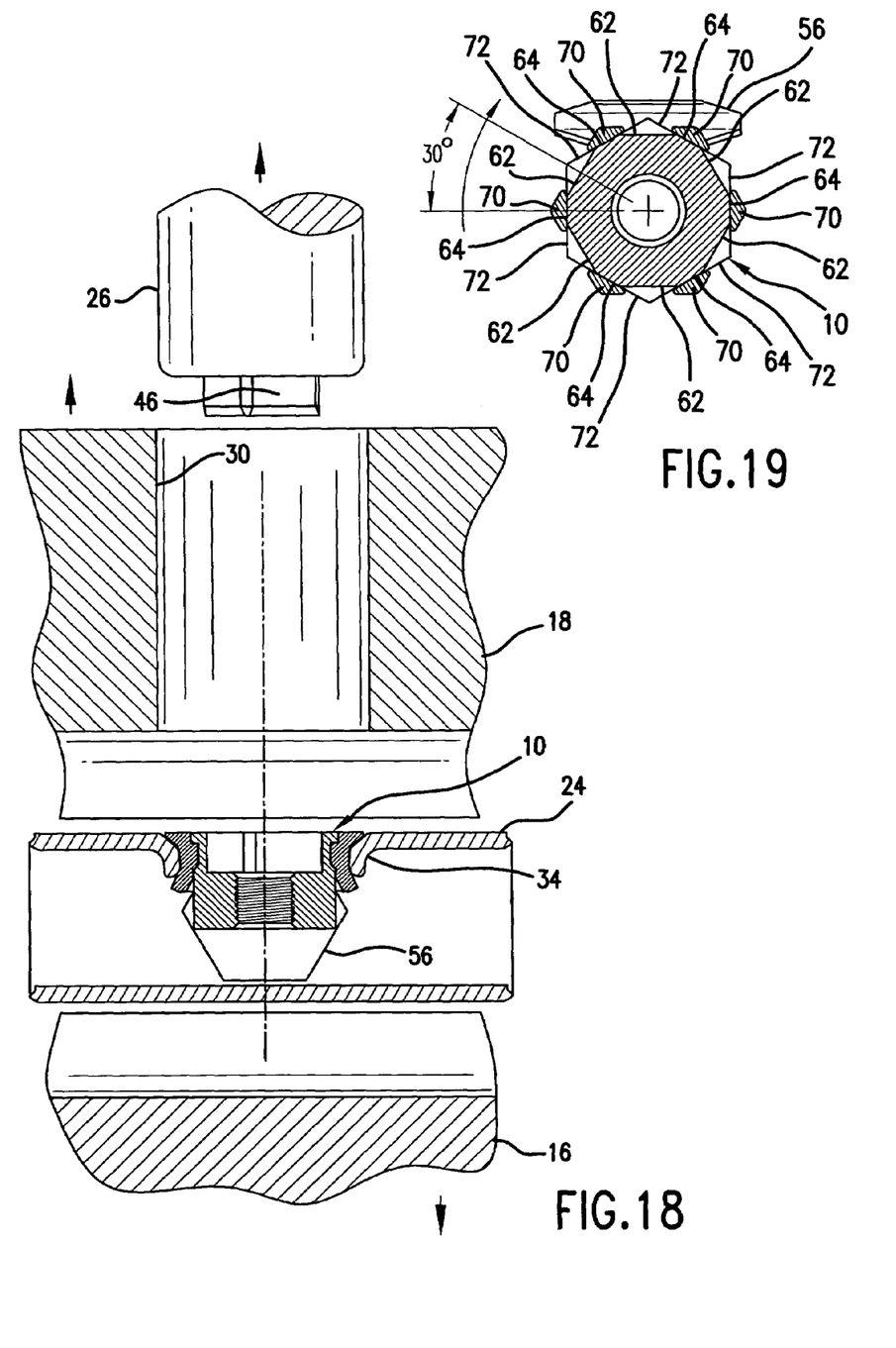
FIG. 19 is a view taken along the line 19—19 in FIG. 16 when looking in the direction of the arrows.

The power unit 12, while continuing to hold the nut 10 in place, then turns the output shaft 26 and thereby the body 36 of the nut less than a complete revolution and in this illustrative example only 30 angular degrees as shown in FIGS. 16 and 19. Wherein with such partial turning of the nut body 36 relative to the stationary locking ring 38 and retention collar 34, the locking ring fingers 70 and thereby directly associated distal end portions of the retention collar 34 are caused to bend radially outward and into locked engagement by action of the ramp surfaces 62 of the cam 60 forcibly deflecting the locking ring fingers 70 radially outward from their recessed locations on the nut body and onto the relatively elevated crests 64 of the cam 60. With this occurring either while the hydroforming fluid remains under pressure in the part as shown in FIG. 16 or is exhausted following the piercing and retention collar forming operations since the only force required to effect the above-described mechanical locking operation is the force required to turn the nut body 36.

Figure 17:
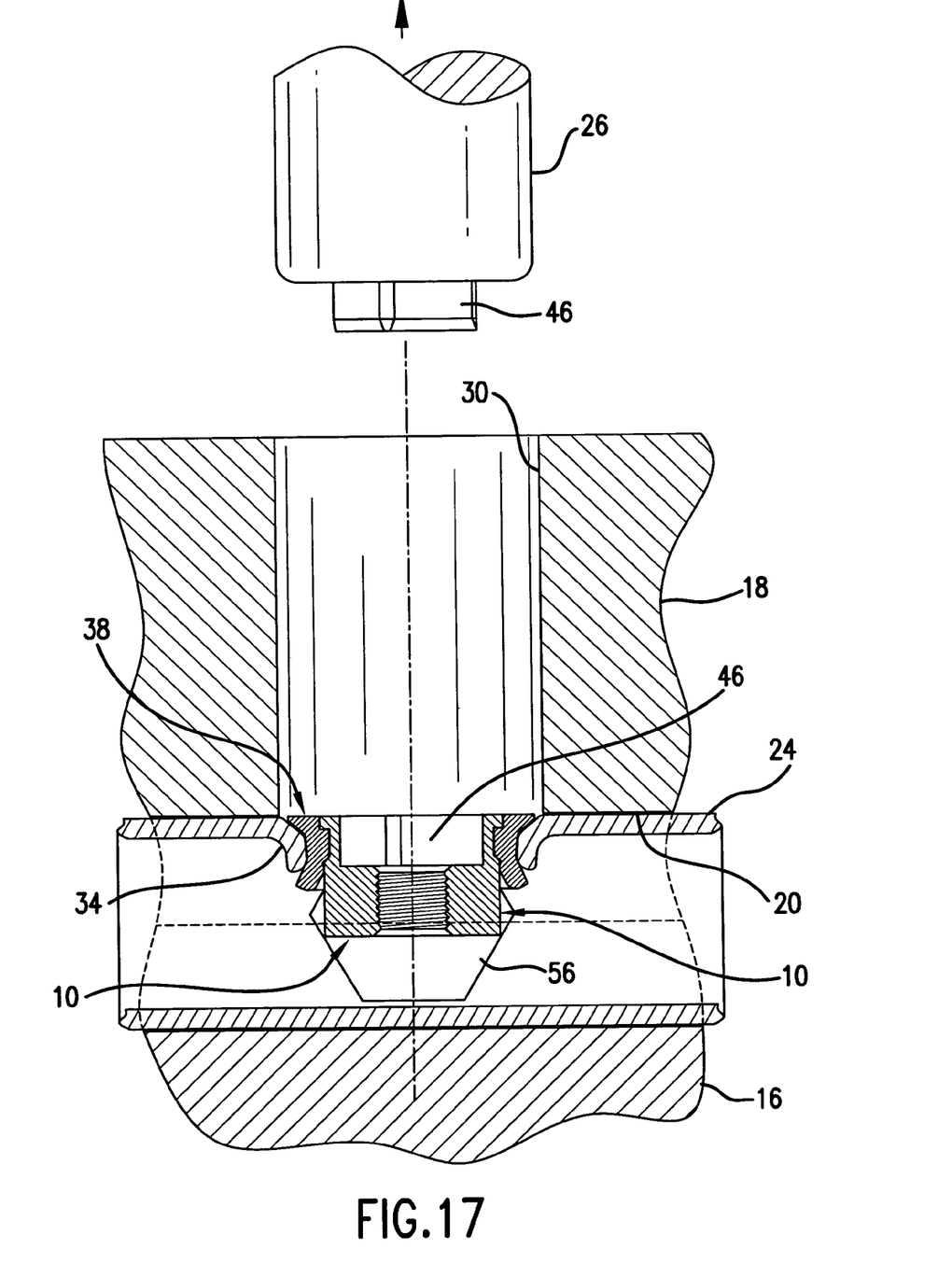

Following the locking of the fastener nut 10 to the hydroformed part 24 and referring to FIG. 17, the power unit 12 then retracts the output shaft 26 to remove the output shaft drive end 46 from the nut body socket 44 while the hydroforming fluid is exhausted from the part if this has not been done already as mentioned above. With the hydroformed part 24 exhausted of fluid, the dies 16 and 18 are then opened as shown in FIG. 18 to permit removal of the hydroformed part in preparation for the insertion of another stock pierce in the dies and commencement of another like nut insertion and fastening process with respect to this new piece. Wherein the power unit output shaft 26 is returned to its starting position shown in FIG. 12 following the closing of the dies 16 and 18 on the next piece of tubular stock that is to be hydroformed and have a like nut then inserted and mechanically locked thereto in like manner immediately following the hydroforming of the stock piece.

In the above exemplary embodiment, a single insertion and fastening of an attachable nut according to the present invention is shown and described and it will be understood that where the hydroformed part is required to have more than one such fastening means and at different locations, this can be accomplished simultaneously in like manner at each required attaching location by employing a corresponding number of power unit installations in the hydroforming apparatus at the respective attaching locations for inserting and fastening a like attachable nut at each of these locations. It will also be understood that the load or fastening capacity of the nut is selected to best meet the requires of a particular application and that in the case where the hydroformed part requires multiple fastening means with different load capacities, the size or fastening capacity of each nut is selected that is best suited at each required attaching location.

It will be understood that while the fastener nut is in the illustrative embodiment positioned and held against the stock piece prior to the hydroforming operation, this assumes that the wall of the stock piece is then against the die cavity surface at this location. On the other hand, if the wall of the stock piece is not and is instead located at a distance from the die cavity surface at the required fastening location, it will be understood that the fastener nut to be inserted and attached is then temporarily held on the end of the output shaft as before described. So that the output shaft can then position and hold the punch end of the nut flush with the surrounding die cavity surface during the subsequent hydroforming of the stock piece wherein the wall of the part is then formed outwardly into contact with the thus positioned punch end of the fastener nut.

Furthermore, it will be understood that with this invention disclosure, various modifications are likely to occur to those skilled in this art as well as to others and therefore it is intended that the invention be limited only by the scope of the appended claims.

The invention claimed is:

1. A fastener nut for hydroformed parts comprising a nut body and a flat-sided locking ring carried by said nut body, said nut body adapted to receive a threaded fastener and having an integral flat-sided punch adapted to pierce and form an inwardly projecting flat-sided retention collar in a hydroformed part while the part remains in a die cavity and under internal hydroforming pressure, said nut body adapted to position said locking ring within said retention collar while positioning said punch beyond said retention collar to thereby prevent turning of said locking ring relative to said retention collar while allowing turning of said nut body relative to said locking ring, and said nut body and said locking ring adapted so that said locking ring on partial turning less than a complete revolution of said nut body with respect to said locking ring causes said locking ring to structurally interlock in a fully assembled position with said retention collar and thereby attach said nut to the hydroformed part while the part remains in the die cavity.

2. A fastener nut as described in claim 1 wherein said locking ring has integral fingers adapted to co-operate with said retention collar to prevent said locking ring from turning with respect to said retention collar, and said nut body is adapted to deflect said fingers outwardly from said nut body into locking engagement with said retention collar on partial turning of said nut body.

3. A fastener nut as described in claim 1 wherein said nut body has a recessed portion defined in part by a cam surface, said locking ring has a ring-shaped body with depending fingers and is received in said recessed portion with said fingers against said cam surface, and said cam surface adapted to initially position said fingers in alignment with the sides of said punch during said piercing and retention collar forming operations by said punch and then on partial turning of said nut body deflect said fingers outwardly from said nut body with rotary cam action and into structural locking engagement with said retention collar.

4. A fastener nut as described in claim 1 wherein said punch is at one end of said nut body and an opposite end of said nut body has a drive socket adapted to be located flush with an outer surface of the hydroformed part.

5. A fastener nut as described in claim 3 wherein said ring-shaped body of said locking ring is split to allow said locking ring to be expanded for reception in said recessed portion of said nut body.

6. A fastener nut as described in claim 3 wherein said punch is adapted to pierce a slug that is integral with the retention collar.

7. A fastener nut as described in claim 3 wherein said punch and said cam surface have a polygonal shape.

* * * * *